United States Patent [19]

Bilodeau et al.

[11] 4,427,750

[45] Jan. 24, 1984

[54] SELF ENERGIZING POWER PACK

[76] Inventors: Jacques Bilodeau, 525 - 32nd Ave., Apt. 401, Lachine, Quebec, Canada, H8T 1Y2; Gaston Marier, 760 St. Charles St., Apt. 4, St. Lambert, Quebec, Canada, J4P 2A3

[21] Appl. No.: 178,978

[22] Filed: Aug. 18, 1980

[51] Int. Cl.³ .......................................... H01M 6/42
[52] U.S. Cl. .................................. 429/149; 429/198; 429/208; 429/204; 429/228
[58] Field of Search ................... 429/149–161, 429/208, 225, 226, 204, 205, 188, 198, 228

[56] References Cited

U.S. PATENT DOCUMENTS

| | | | |
|---|---|---|---|
| 1,459,659 | 6/1923 | Ellis et al. | 429/204 |
| 1,512,485 | 10/1924 | Pouchain | 429/198 |
| 2,514,151 | 7/1950 | Berg et al. | 429/208 X |
| 3,388,007 | 6/1968 | Fiandt | 429/149 X |
| 3,467,550 | 9/1969 | Thörnblad | 429/149 |
| 3,661,646 | 5/1972 | Barrett, Jr. | 429/208 |
| 3,711,332 | 1/1973 | Bastacky | 429/225 X |
| 4,022,951 | 5/1977 | McDowall | 429/149 |
| 4,170,470 | 10/1979 | Marshall et al. | 429/226 X |
| 4,224,383 | 9/1980 | Taylor | 429/149 X |
| 4,279,977 | 7/1981 | Matter | 429/226 X |
| 4,346,150 | 8/1982 | Bellows et al. | 429/149 X |

*Primary Examiner*—Charles F. LeFevour
*Attorney, Agent, or Firm*—Schwartz, Jeffery, Schwaab, Mack, Blumenthal & Koch

[57] ABSTRACT

A wet-type self energizing power pack is disclosed which uses an electrolyte essentially made of oil, sulfuric acid and a minor amount of acetic acid. The device includes positive and negative plates which are separated by means of separators. The positive plates mainly consist of an alveolated structure filled with a compound of carbon, lead oxide, glycerine are provided with a diagonal row of holes while the negative plates are made of lead-tin alloy and are provided with two rows of holes, one appearing at the top and the other one appearing at the bottom of the plate. A method of preparing the electrolyte is disclosed as well as the method of charging the battery.

7 Claims, 7 Drawing Figures

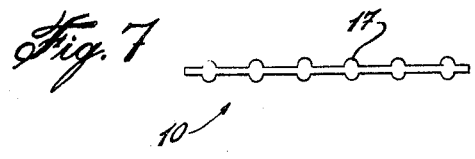
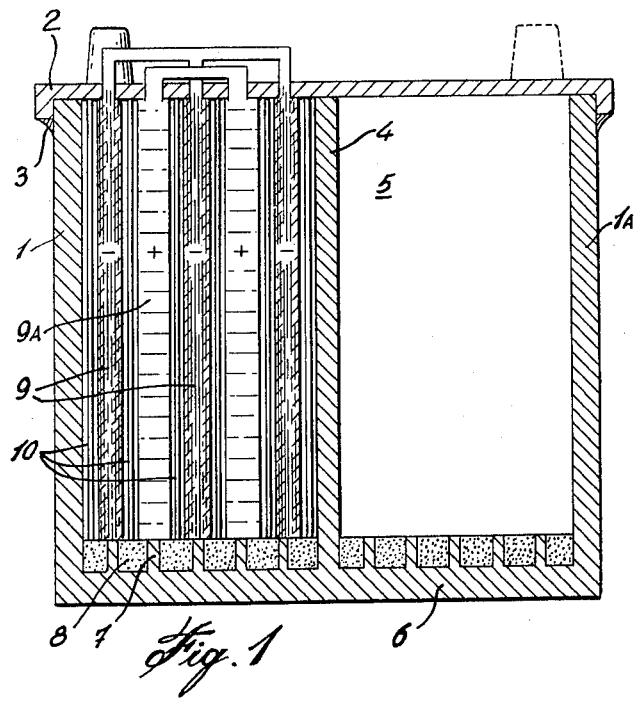
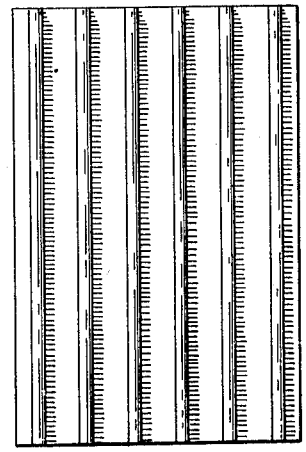
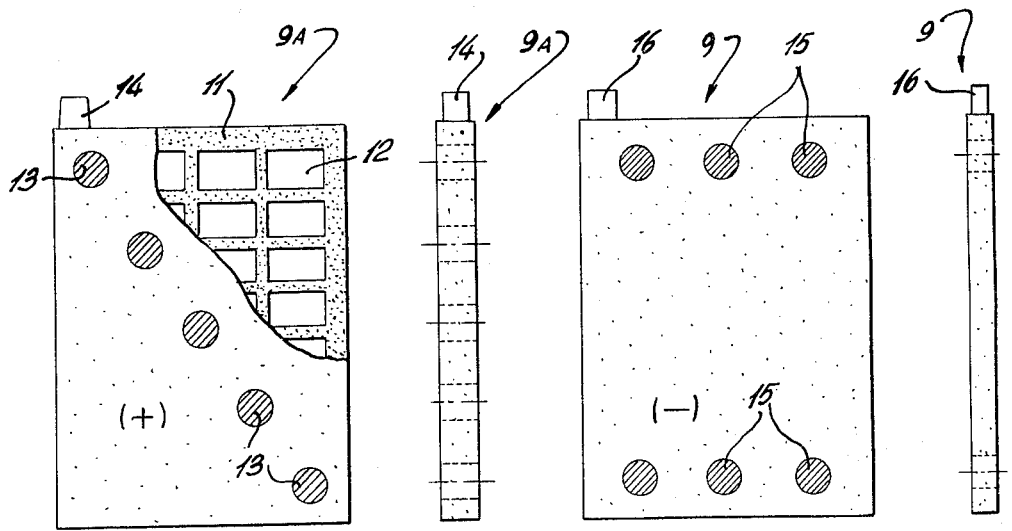

SELF ENERGIZING POWER PACK

BACKGROUND OF THE INVENTION (a) Field of the Invention

This invention relates to a self-energizing power pack or new type of accumulator. The invention also relates to an electrolytic composition which is intended to be used with the power pack or accumulator according to the invention. More particularly, the present invention relates to an electrolytic device which recovers most of its own electrical energy once its potential has been reduced to substantially zero. More particularly, the invention to a power pack in which only a few minutes are required to recover nearly all its original energy.

(b) Description of the Prior Art

Wet-type storage batteries presently in use usually consists of a plurality of positive and negative electrodes in the form of plates alternately positioned with respect to each other with the area between the plates being filled or substantially filled with an electrolyte solution permitting migration of ions between adjacent positive and negative plates depending on whether the battery is being charged or is undergoing discharge.

The most common form of wet-type storage battery presently in use today consists of a casing of rubber or suitable plastic material or the like, with the positive plates or electrodes being lead and the negative plates or electrodes being lead oxide, and an electrolyte consisting of a mixture of sulfuric acid and water. This battery is commonly referred to as being a lead-acid type. The density or specific gravity of the sulfuric acid/water electrolyte solution used in known lead-acid storage batteries is 1.100 when the battery is fully discharged and 1.280 when the battery is fully charged.

The major disadvantages of known lead-acid type batteries are their weight (ratio of electrical energy amperehour) to weight; the fact that hydrogen is evolved during charging of the battery providing a dangerous and explosive atmosphere; the fact that charging devices have to be employed for extended periods of time to rejuvenate a fully discharged or partially discharged battery to full charge capacity; the formation of corrosive deposits at the battery terminals and/or at the battery supports; the fact that they are completely discharged and become practically dead after a certain period of use.

SUMMARY OF THE INVENTION

The invention relates to a wet-type self energizing device or accumulator which comprises:

a housing made of non-corrosive material;

grid means at the bottom of said housing;

upright partitions dividing said housing into a plurality of individual cells;

each cell containing alternating upright positive plates and upright negative plates resting on said grid means;

upright separator plates disposed between said positive plates and said negative plates;

there being one positive plate less than said negative plates;

said separator plates having means to allow free movement of an electrolyte along both sides of said positive and negative plates;

each positive plate being provided with a plurality of holes extending therethrough;

means to electrically and mechanically connect said positive plates together;

each negative plate being provided with a plurality of holes extending through said negative plates in the upper and lower portions thereof;

means to electrically and mechanically connect said negative plates together;

a cover to seal said housing; and positive and negative terminals respectively associated with said positive and negative plates.

The invention also relates to an electrolyte composition which comprises a mixture of refined mineral oils, sulfuric acid and acetic acid.

In accordance with another aspect of the invention, there is provided a method of preparing the above composition which comprises stirring a mixture of refined mineral oils and sulfuric acid under electrolytic conditions, at about 115 volts and shortly before the stirring operation is ended, adding a small amount of acetic acid to the mixture. Preferably, the entire stirring should last about 60 minutes.

In accordance with yet another aspect of the invention, there is provided a method for charging a wet-type storage battery or accumulator as defined above, which comprises adding to the above electrolyte composition to said power pack or accumulator, applying a current of 48 volts and 35 amperes during about 5 minutes, and while maintaining the voltage at about 48 volts, gradually decreasing the quantity of amperes applied until the power pack or accumulator is completely charged.

BRIEF DESCRIPTION OF DRAWINGS

FIG. 1 is a longitudinal cross-sectional view of the the power pack according to the invention;

FIG. 2 is a partial view in elevation of a positive plate;

FIG. 3 is an end view of the positive plate;

FIG. 4 is a view in elevation of negative plate;

FIG. 5 is an end view of the negative plate;

FIG. 6 is a view in elevation of a separator; and

FIG. 7 shows the same separator viewed from above.

Referring to the drawings, the power pack according to the invention comprises a housing 1 which is made of a non-corrosive material, such as plastic, glass, rubber or stainless steel, said housing serving as container for the other elements of the power pack. A suitable cover 2 designed to take into account the different polarities of the internal plates, and also made of non-corrosive material, (in general, of the same material as that of the housing) is mounted to the housing and sealed at 3. This provides a definite advantage during handling of the power pack and requires no maintenance nor addition of supplementary electrolyte as it is the case with conventional batteries.

Inside the housing, there is one or more upright partitions 4 which define separate and individual chambers or cells 5. These upright partitions are unitary with the housing 1. The bottom 6 of the housing is in general thicker than the walls 1A and partitions 4 in order to make sure that the accumulator is resistant to shocks. The inner part of the bottom 6 is made of transverse and longitudinal ribs 7, 8 which are interconnected to define a grid. This grid is intended to recuperate the impurities which could form at the bottom of the power pack and prevents them from travelling throughout the power pack while being suspended in the electrolyte and possibly damaging the plates. It would therefore be realized that each cell 5 is made of a portion of grid as described above. The number and dimensions of the cells can vary to a large extent depending on the required characteristics of the power pack, such as required power, life expectancy of the power pack and other considerations of different character.

In each chamber or cell 5, there are three different types of plates each having a specific composition and function. These plates are positive plates 9A, negative plates 9 and separator plates 10.

The thicker plates are the so-called positive plates 9A and according to the invention, it is preferred to have a number of positive plates which is one less than the number of negative plates 9, the latter obviously being thinner than the positive plates 9A.

Between each positive plate 9A and each negative plate 9, there is a separator plate 10 which will be better described hereinbelow.

We shall now return to the positive plates 9A which constitute one of the more important elements of the power pack according to the invention. In the embodiment illustrated, each positive plate is made of a framework 11 which contains alveoli 12. The material of the plate 9a consists of carbon, lead oxide, pure glycerine and a standard filler material. This alveolated framework member is intended to retain the positive compound per se of the plate. The element which is used to fill the alveoli 12 includes pure and fine powdered carbon, lead oxide and a commercial filler compound for strength. This component is mixed together with 1.5 volume percent of pure glycerin and sulfuric acid in order to give a paste which is easy to handle and enables to polish the surface of the finished plate in addition to give it specific dielectric properties. The finish of the plate before baking should be produced with utmost care. The surface should be very uniform, flat, without cavities and as smooth as possible. Once the material has been applied to the framework member, the plate is baked at 200° F. for three minutes. Thereafter, the plates are allowed to cool slowly. The reason for this choice of positive element of the power pack is that there will be no substantial formation of salt and consequently no discharge and disintegration of the power pack plates.

In order to have a better superficial electrical equilibrium of the opposite faces of the same plate and to facilitate the equilibrium of the lateral pressures which could be exerted during some operations involving electrical transfer such as an automatic recharge, it is important to have holes 13 formed through the plates 9A, along a diagonal line as particularly illustrated in FIG. 2 of the drawings. These holes will make it possible to ensure a better circulation of the electrolyte during re-charge and will also reduce the time needed for this operation. Finally, each positive plate 9A is provided with an extension tab 14 which enables an electrical and mechanical connection between the positive plates during the manufacture of the power pack and when using the same.

Turning now to the negative plate 9, with particular reference to FIGS. 4 and 5, it will be seen that they are substantially of the same dimensions as the positive plates 9A, except that they are thinner than the positive plates. Reference is made to FIGS. 3 and 5. The negative plates 9 are made of an alloy consisting of 50% lead and 50% tin by volume. A commercial filler may be added for strength. The negative plates 9 are also provided with holes, shown by reference numeral 15 in FIG. 4, to facilitate an exchange of electrolyte and the self-regeneration of the power pack. Preferably, the holes 15 should appear in two horizontal rows. The first row is at the top of the plate, near the upper edge thereof while the second row appears at the bottom of the plate near the lower edge. Reference is made to FIG. 4. Preferably, there is no hole 15 nor any other opening in the central portion of the negative plate, because these holes would then be without effect and in some cases they might even be harmful to the hydraulic and electrical equilibrium of the negative plates especially during a self-charge operation. There is provided an extension tab 15 at the top of the negative plate in order to electrically and mechanically connect the negative plates together when mounting and assembling the power pack. These extensions 15 will obviously be useful also when the battery is in use.

Naturally, the positive plates 9A and the negative plates 9 should never be in contact with one another within the same cell as it is well known in the art. On the contrary, they should be separated from one another by means of an insulating element called separator 10. Reference is made to FIG. 6 of the drawings. As shown, the lateral faces of the separator should be constructed in such a manner as to facilitate a free vertical circulation of the electrolyte along both sides of the plates 9 and 9A.

To enable such vertical circulation of the electrolyte, there are provided continuous vertical ribs 17 on both sides of the plates 10. Reference is made to FIG. 7 of the drawings.

Preferably, the separator plates 10 should be made of non-corrosive fiber material while the ribs should consist of non-corrosive rubber. Of course, other materials could be used to prepare those plates. However, it is highly recommended that the ribs be made of rubber in order to enable them to act as shock-absorbers when the battery is handled or used, since accidental shocks could damage the negative and positive plates 9 and 9A.

Within the same cell, the positive plates are separated from the negative plates by using non-conductive separators 10 as described above. It should be noted that the space between the separator plate 10 and the face of an adjacent negative or positive plate should be sufficient to provide for a vertical circulation of the electrolyte, which of course is an indispensable condition to the self-regeneration of the power pack.

Turning now to the electrolyte which will be used in the battery described above, it preferably contains a mixture of four mineral oils, of different specific gravity, sulfuric acid, and a minor amount of acetic acid. The presence of acetic acid is important for regeneration, when the battery has no more apparent power.

Preferably the mixture comprises up to about 20 volume percent sulfuric acid, up to about 80 volume percent of a mixture of refined mineral oils of different densities, and a minor amount of acetic acid.

For example, the electrolyte could comprise about 17.39 volume percent of an uncolored hydraulic oil, grade No. 20, having a specific gravity at 15.6° C. of 0.8762, about 21.74 volume percent of an uncolored hydraulic oil Grade No. 5 having a specific gravity of 15.6° C. of 0.8581, about 21.74 volume percent of an uncolored hydraulic oil Grade No. 40 having a specific gravity at 15.6° C. of 0.8822, about 17.39 volume percent of an uncolored hydraulic oil Grade No. 30 having a specefic gravity at 15.6° C. of 0.8778, up to about 21.74 volume percent sulfuric acid having a specific gravity of 1.30 mixed with a minor amount of 0.4 volume percent of the mix oil-acid of acetic acid.

The electrolyte may be prepared as follows:

In a reservoir made of non-corrosive material, a mixture comprising 17.39 volume percent of uncolored hydraulic oil Grade No. 20 and 21.74 volume percent of uncolored hydraulic oil Grade No. 5, is stirred during 5 minutes with a rotary stirrer which operates at 200 rpm. The stirrer should move longitudinally and transversely with respect to the reservoir, in a motion "described by the number 8".

This mixture will be set aside and will be called mixture M1.

In a similar manner, a second mixture, M2 is prepared by mixing together 21.74 volume percent of uncolored hydraulic oil Grade No. 40 and 17.39 volume percent of uncolored hydraulic oil Grade No. 30 except that mixing time is 6 minutes and the mixer operates at 125 rpm.

Immediately after the two mixtures M1 and M2 have been prepared, they are mixed together to form mixture M3 in the following manner:

In a non-corrosive reservoir, there are introduced first, mixture M1 followed by mixture M2. The resulting mixture M3 is stirred with the same type of agitator as described above during 5 minutes at a speed of 100 rpm.

In order to give special properties to the mixture M3 which will be useful in the self-regeneration of the power pack, the mixture should be ionized in the presence of sulfuric acid by operating as follows:

The mixture M3 which has been described above is poured into a non corrosive container, preferably made of glass material. At both ends of this reservoir, there are two carbon electrodes which are connected to an AC current operating under 115 volts. Once the mixture has been introduced into the reservoir, there is slowly added 21.74 volume percent sulfuric acid while continuously stirring but trying to prevent any splash by taking special measures as it is well known in laboratory procedures. Once the acid has been poured, a current of 115 volts is allowed to pass through the solution during 60 minutes without interruption. Mixing of the mixture should be continued without interruption during the entire period when the electrolysis takes place.

Five minutes before the end of the mixing operation, and without stopping any stirring of the mixture, there are added slowly about 4 ml acetic acid per liter of solution and stirring is continued to the end of the period of 60 minutes at the prescribed speed.

The electrolytic solution is thereafter ready for use. It can be stored away and kept in non-corrosive containers until its use.

The plates of the various cells are electrically connected by means of lead rods as in a conventional battery.

For mounting the power pack according to the invention, the positive and negative plates as well as the required separators are placed in appropriate cells. Generally speaking, in a standard 12 volt battery, there will be 6 negative plates and 5 positive plates per cell. As pointed out above, the separator plates are inserted between the plates of opposite polarity. Once the plates have been assembled, they are connected together by means of a suitable rod. Before introducing the assembly in the cavity defined by a cell, it must be soaked in a sulfuric acid bath which has a density 1.800 during about 4 seconds in order to prepare the assembly for the charge. This operation cleans the surfaces and enables the positive plates to be susceptible to a good electrical charge. Temperature rapidly rises to about 95° F.

After the cleaning operation, the plates are removed from the acid bath, and they are inserted in the various cells of the battery housing. Then, the electrolytic mixture described above is introduced until it completely covers all the plates. Finally, the cover is put over the housing and is sealed at 3.

The power pack is charged during 36 consecutive hours by using at the start, i.e. the first 5 hours, a potential of 48 volts and an energy of 35 amperes. The voltage is maintained at that value during the entire period where the charge takes place, however, the amperage gradually decreases as the power pack is being charged. It is interesting to note that once the power pack is charged, the solution is not acidic.

Surprisingly, the self energizing power pack of the present invention has been found to require no supply of outside energy to regain its energetic potential. The power pack recovers nearly all its original power by itself without any assistance. The advantages of such an accumulator are obvious since it can last nearly indefinitely even when it is used at very low temperatures.

For example, when the power pack is used as a source of auxiliary power on motor vehicles, it is only necessary to supply a small amount of outside energy such as with an alternator for a very small period of time in order to recover the original power of the accumulator which remains as nearly as powerful as at the start.

Another advantage of the power pack according to the invention is that it is capable of supplying important energy during much longer periods of time than with standard accumulators.

There is no boiling off of the electrolyte during the charge by means of an outside current, which makes the process less dangerous and without loss.

The terminals of the power pack show no signs of corrosion or alteration as it is readily found in the case of a standard battery which has been used for a substantial period of time.

As a result of tests which were carried out with the accumulator according to the invention, it has been found that the latter possesses a strong internal resistance, which is important especially during rapid discharge such as during ignition periods or if accidental short circuits take place.

The accumulator according to the invention is completely sealed which prevents any danger of corrosion and facilitates handling and storage.

The accumulator according to the invention can be made of any size desired, and it could be manufactured in any of the commercial dimensions where standard batteries are used.

In view of the nature of some of its plates, and the composition of the electrolyte which includes oil, the accumulator according to the invention is slightly lighter and therefore it is more easily carried.

Because of the nature of the positive plates which are made of carbon, the latter are not easily plugged as in the case of standard batteries since when they stop being in operation, only a few minutes are required to recover their original strength.

I claim:

1. A self energizing power pack or accumulator which comprises:
   a housing;
   grid means at the bottom of said housing;

upright partitions dividing said housing into a plurality of individual cells;

each cell containing alternating upright positive plates and upright negative plates resting on said grid;

upright separator plates disposed between said positive plates and said negative plates;

there being one positive plate less than said negative plates;

said separator plates having means for allowing free movement of an electrolyte along both sides of said positive and negative plates;

each positive plate being provided with a plurality of holes extending therethrough along a diagonal line to ensure a good circulation of the electrolyte during re-charge and to reduce the time needed during said re-charge;

means for electrically and mechanically connecting said positive plates together;

each negative plate being provided with a plurality of holes extending through said negative plate in the upper and lower portions thereof;

means for electrically and mechanically connecting said negative plates together;

a cover to seal said housing;

positive and negative terminals respectively associated with said positive and negative plates;

said cells being loaded with an electrolyte which comprises up to about 20 volume percent sulfuric acid, up to about 80 volume percent refined mineral oils mixture and a minor amount of acetic acid.

2. A self energizing power pack or accumulator according to claim 1, wherein said housing and said cover are made of a material selected from the group consisting of non-corrosive plastic, glass, rubber and stainless steel.

3. A self energizing power pack or accumulator according to claim 1, wherein said positive plates are thicker than said negative plates.

4. A self energizing power pack or accumulator according to claim 1, wherein said grid means comprise a plurality of interconnecting ribs on which said plates rest.

5. A self energizing power pack or accumulator according to claim 1, wherein said positive plates comprise an alveolated framework member which consists of carbon, lead oxide, glycerin and filler, in which each alveole is filled with a composition comprising pure powdered carbon and glycerin.

6. A self energizing power pack or accumulator according to claim 5, wherein said negative plates are made of lead-tin alloy, a first horizontal row of said holes being formed along the upper edge of said negative plate and a second horizontal row of said holes being formed along the lower edge of said negative plate.

7. A self energizing power pack or accumulator according to claim 5, wherein said separator plate is made of non-corrosive fiber material and is provided with vertical rubber ribs on both sides thereof thereby allowing free vertical movement of said electrolyte along both sides of said positive and said negative plates.

* * * * *